United States Patent [19]

Sako

[11] Patent Number: 4,897,240

[45] Date of Patent: Jan. 30, 1990

[54] NUCLEAR REACTOR

[75] Inventor: Kiyoshi Sako, Ibaraki, Japan

[73] Assignee: Japan Atomic Energy Research Institute, Tokyo, Japan

[21] Appl. No.: 348,097

[22] Filed: May 2, 1989

Related U.S. Application Data

[63] Continuation of Ser. No. 57,386, Jun. 2, 1987, abandoned.

[30] Foreign Application Priority Data

Jun. 2, 1986 [JP] Japan ................................ 61-127782

[51] Int. Cl.$^4$ ............................ G21C 7/22; G21C 9/00
[52] U.S. Cl. ..................................... 376/328; 376/282;
376/406; 376/352; 376/264; 376/272; 376/277
[58] Field of Search ............... 376/402, 352, 328, 307,
376/406, 264, 271, 282, 272, 277

[56] References Cited

U.S. PATENT DOCUMENTS

| | | | |
|---|---|---|---|
| 3,136,432 | 6/1964 | Nicoll et al. | 376/271 |
| 3,245,881 | 4/1966 | Ammon et al. | 376/406 |
| 3,247,076 | 4/1966 | Tutte et al. | 376/402 |
| 3,284,307 | 11/1966 | Schortmann | 376/328 |
| 3,372,092 | 3/1968 | Margen | 376/264 |
| 3,607,634 | 9/1971 | Gerard et al. | 376/406 |
| 4,053,356 | 10/1977 | Brammer, Jr. | 376/271 |
| 4,057,467 | 11/1977 | Kostrzewa | 376/406 |
| 4,526,742 | 7/1985 | Hannerz | 376/282 |
| 4,716,011 | 12/1987 | Taleyarkhan | 376/352 |

FOREIGN PATENT DOCUMENTS

| | | | |
|---|---|---|---|
| 2625543 | 12/1976 | Fed. Rep. of Germany | 376/328 |
| 3036933 | 5/1982 | Fed. Rep. of Germany | 376/282 |
| 1080833 | 8/1967 | United Kingdom | 376/328 |
| 1100767 | 1/1968 | United Kingdom | 376/328 |
| 8601632 | 3/1986 | World Int. Prop. O. | 376/406 |

OTHER PUBLICATIONS

"Pressurized Water Reactor Inherent Core Protection by Primary System Thermohydraulics", Babala et al.; Nuclear Science and Engineering, 90, 400–410, 1985.
Nuclear Technology, vol. 38, 4/78, pp. 144–154, Gramsell et al.

Primary Examiner—Harvey E. Behrend
Attorney, Agent, or Firm—Wenderoth, Lind & Ponack

[57] ABSTRACT

A nuclear reactor includes a reactor vessel, a reactor core disposed within the vessel and including fuel rods, a primary cooling system disposed in the vessel and including a steam generator and a pump and a poison tank disposed within the vessel and containing high concentration boric acid solution. The poison tank surrounds the reactor core, and the steam generator surrounds a portion of the poison tank.

5 Claims, 16 Drawing Sheets

NUCLEAR REACTOR

This application is a continuation of now abandoned application, Ser. No. 07/057,386 filed on June 2, 1987.

BACKGROUND OF THE INVENTION

This invention relates to improvements in nuclear reactors.

PRIOR ART

As light water nuclear reactors, pressurized water reactors (referred to as PWR hereinbelow) and boiling water reactors (referred to as BWR hereinbelow) have been highly developed and practically operated as power reactors. As atomic-powered ship appliances, unitary type PWRs wherein a steam generator and a pump are housed in the nuclear reactor are also known. In these nuclear reactors, in order to stop the operation of the reactor, the reactor is stopped by a control rod or, in case of an emergency, the reactor is stopped by pouring a poison consisting of boric acid solution from an external supply source into the reactor core. As an ultrasafe PWR, there has been proposed a reactor of the type wherein high concentration poison is placed in the reactor vessel formed of prestressed concrete or steel and the primary cooling system appliances (core, pump, steam generator and so on) are disposed within the vessel. In a reactor of this type, when an abnormality such as pump stoppage, for example, occurs, the surrounding poison is poured into the reactor core whereby the reactor operation is automatically stopped. In this type of reactor, the temperature of the poison is maintained at 100° C., for example, and differential pressure (0.3–0.4 atmospheric pressure, for example) caused by a difference in the density and level (position) of the density based on the difference between the temperature of the poison and that of the cooling water at the outlet of the reactor core is introduced into the core. During the operation of the reactor, the differential pressure in the core is made equal to the above-mentioned value to maintain a balance so that the poison is prevented from entering the primary cooling system. The primary cooling water and poison are communicated with each other via two interfaces at low positions of the inlet and high positions of the outlet of the reactor core. The interface may be a honeycomb structure or a bundle of thin-walled small diameter tubes so that the primary cooling water and poison will mingle together even when more or less of an imbalance of pressure occurs. Furthermore, since the nuclear reactor of this type employs no control rod and controls of the reactivity change due to fuel burn up and reactor power, the poison concentration in the primary cooling water is adjusted.

However, the prior art nuclear reactor of this type has the drawback that since the poison tank is disposed externally of the reactor and the poison is poured into the reactor core in case of emergency, the system becomes complicated by the provision of means for protection of the connecting piping against breakage. Furthermore, in the ultrasafe nuclear reactor of this type, since the primary cooling water contacts the reactor vessel through the poison, it is difficult to utilize the technology of the prior art PWR and BWR. Furthermore, in the system in which only the upper and lower interfaces such as honeycombs and the like, are provided, since the differential pressure which the reactor core accommodates is subject to limitation, the reactor has the drawback that the reactor lacks flexibility in design and operation.

SUMMARY OF THE INVENTION

Thus, the object of the present invention is to provide a practical and useful nuclear reactor which can effectively eliminate the drawbacks inherent in the prior art nuclear reactors referred to hereinabove.

In order to attain such object, according to the present invention, in an nuclear reactor of the type wherein the primary cooling system is disposed in the reactor vessel, a poison tank as the emergency stoppage system is disposed in the reactor vessel.

According to the present invention, there is provided a nuclear reactor which comprises a reactor vessel, a reactor core disposed within said vessel and including fuel rods, a primary cooling system disposed within said vessel and including a steam generator and a pump, and a poison tank disposed within said vessel and containing high concentration boric acid solution, said poison tank being disposed to surround said reactor core, and said steam generator being disposed to surround an upper reduced diameter portion of said poison tank.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

DETAILED DESCRIPTION OF THE PREFERRED EMBODIMENTS

Figure 1:
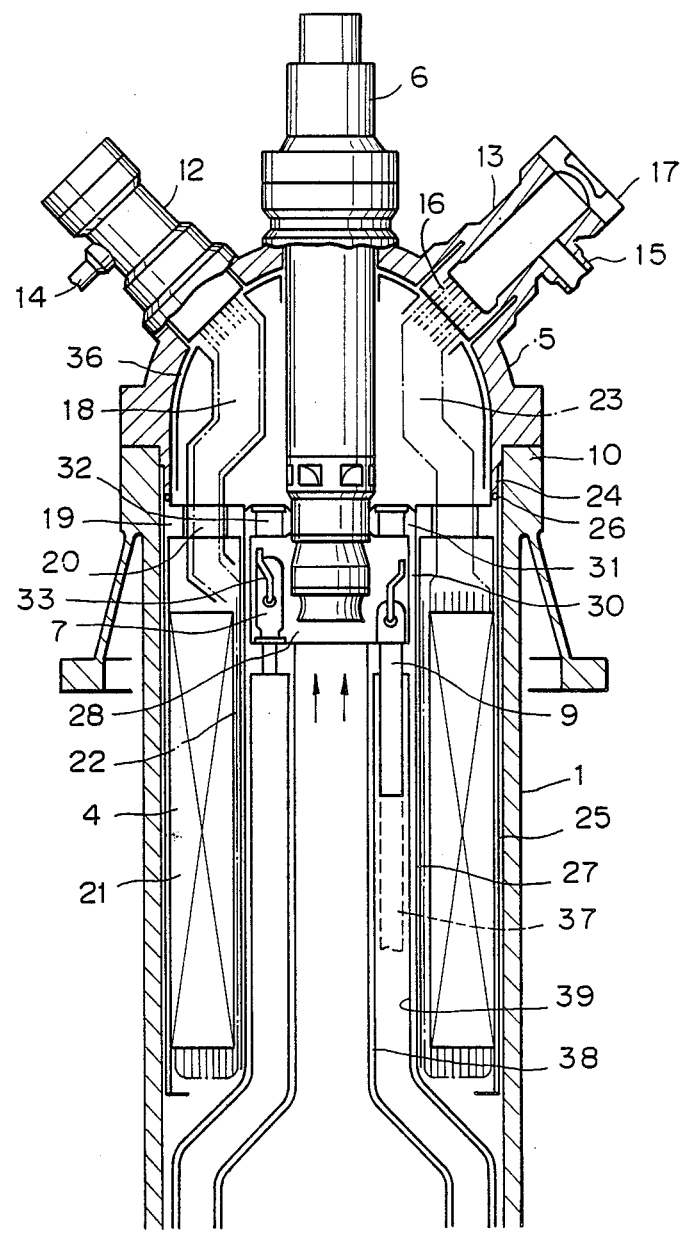
FIG. 1 is a vertically sectional view of the upper half portion of a first embodiment of a nuclear reactor according to the present invention.
Figure 2:
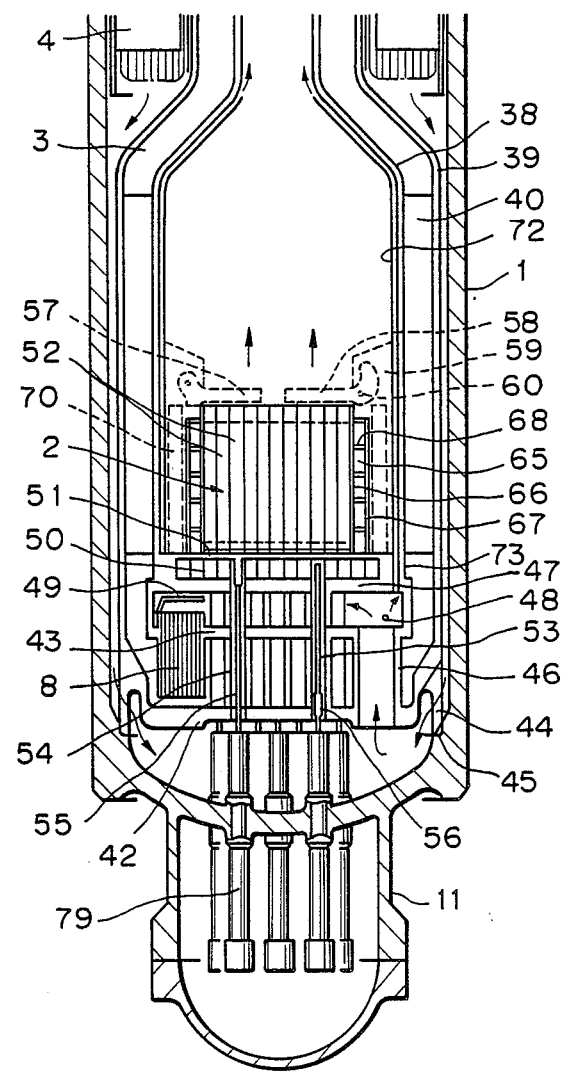
FIG. 2 is a vertically sectional view of the lower half portion of said nuclear reactor of FIG. 1.

First referring to FIGS. 1 and 2 of the accompanying drawings wherein the first embodiment of the nuclear reactor according to the present invention is shown, the reactor comprises a reactor vessel 1, a reactor core 2 provided within the vessel 1, a pump 6 as the primary cooling system, a steam generator 4 and a poison tank 3. A plurality of fuel rods as the fuel for the reactor and a plurality of control rods are disposed within the reactor core in the conventional arrangement. The poison tank 3 is disposed surrounding the reactor core 2 and the steam generator 4 is disposed about an upper reduced diameter portion of the poison tank 3.

In the illustrated embodiment, the steam generator 4 is made integral with a cap 5 of the vessel 1 and the above-mentioned pump 6 is provided on the top of the vessel cap 5.

In the operation of the reactor, the pressure level in the primary cooling system is on the order of 150 atmospheres and the temperature of the cooling water at the inlet/outlet of the reactor core is on the order of 290°/320° C. The poison tank 3 is filled with high concentration boric acid solution and the temperature of the poison is set to a suitable temperature below the temperature of the cooling water, such as 100°–200° C., for example. Variation in the temperature of the poison is controlled within the range of ±5° C. The upper end portion of the poison tank 3 is communicated with water at the outlet of the reactor core 2 via a hydraulically operated valve 7 and the lower end portion of the poison tank is communicated with water at the inlet of the reactor core via a gradient lock means 8 so that the poison will not mix with the primary cooling water even when the poison volume within the poison tank varies within the temperature control range to thereby provide an allowance for controlling the poison temperature. The means 8 may be a honeycomb construction or a bundle of thin-walled pipes of small diameter. The valve 7 is closed during the operation of the pump 6 and when the delivery pressure of the pump drops, the valve is released or opened. Therefore, the poison temperature can be set independently of pressure loss in the reactor core, or in other words, the pressure loss in the reactor core can be freely set. The concentration of boron in the poison should be a value necessary to cease the operation of the reactor, and the value of boron concentration is 8,000 ppm, for example, though the value depends upon the nuclear characteristic of the reactor core. If necessary, enriched $^{10}B$ may be employed in place of natural boron. When the pump ceases to operate and the valve is released, the initial differential pressure caused by a difference in densities between the poison and primary cooling water based on the difference in temperatures between the poison and primary cooling water is on the order of 0.2–0.4 atmospheric pressure, for example, depending upon the temperature set for the poison. The poison is poured into the reactor core under the initial differential pressure as the driving force while mixing with the primary cooling water. In order to resume the operation of the reactor, the pump is first actuated. Since the pump is operated for a short time period at this time, the valve is not required to be firmly closed and as a result, the pump may be operated under a partial load. Next, the poison at high temperature and in high concentration is poured into the poison tank at the upper portion thereof so as to minimize the mixing of the poison with the poison within the poison tank and the diluted poison is discharged from the bottom of the tank into the primary cooling system. Thereafter, a poison cooling means 9 is actuated to cool the poison to a predetermined temperature and the cooled poison mixes with the primary cooling water in conventional relationship. Thereafter, the temperature of the primary cooling water is raised to the temperature at the inlet of the nuclear reactor, the pump is operated with full output and the concentration of boron in the primary cooling water is reduced to the level required for operation.

The reactor vessel 1 is provided in an upper end portion with a flange 10 and if necessary, the panel board at the bottom of the vessel may be provided with a housing 11 of a control rod drive mechanism to prevent leakage. Air or inert gas at a substantially ambient pressure is filled in the housing. The body of the vessel 1 is not.provided with any pierced portion.

Figure 4:
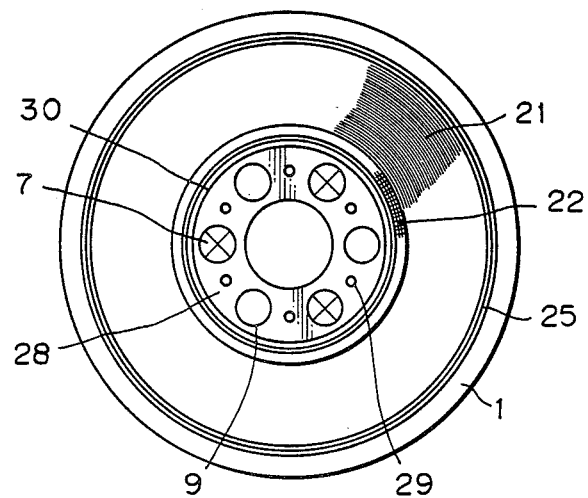
FIG. 4 is a plan view of an upper portion of a poison tank.

The cap 5 of the reactor vessel 1 is provided with three circumferentially spaced water supply headers 12 and three steam headers 13 disposed between the water supply headers 12. Water distribution supply pipes 14 and steam distribution pipes 15 are connected to the side walls of the water supply headers and steam headers, respectively, and in communication with the interior of the associated headers, and a cap 17 is provided for each header in a position in which a tube plate 16 associated with the respective header can be directly observed so that the pipe support board and heat transfer pipe can be easily inspected and/or repaired. A water supply pipe bundle 18 extends through a hole 20 in a heat transfer system support board 19 into an upper portion of heat transfer section 21 of the steam generator and becomes a down comer 22 which extends downwardly through the steam generator heat transfer section 21 and emerges at the lower end of the heat transfer section. A steam pipe bundle 23 extends through another hole 20 in the support board 19 and is connected at the upper end to the tube plate 16. Although not shown, an adiabatic sleeve is disposed between the down comer and heat transfer section to limit heat exchange therebetween. The heat transfer section is formed by a helical heat transfer tube and includes support material filling vertical and lateral spaces present between the pipes in the pipe bundle. The heat transfer section is suspended from the support board 19. The support board 19 is connected to a skirt 24 of the cap 5 of the reactor vessel. An outer sleeve 25 surrounds the side wall of the heat transfer section to protect the heat transfer section. A small bypass flow is guided through a number of orifices 26 in the skirt 24 of the cap 5 into the annular space defined between the heat transfer sleeve 25 and the side wall of the reactor vessel 1 so as to prevent the primary cooling water from standing there. An inner heat exchange sleeve 27 protects the heat transfer tube in the same manner as does the outer sleeve 25. The poison tank 3 includes an upper board 28 on which three circumferentially spaced valves 7 and an equal number of coolers 9 disposed between the valves 7 are disposed. Six thermocouple conduits 29 (FIG. 4) extend from the reactor core 2 through the poison tank 3 into and through the upper board 28. Although not shown, a neutron detector tube also extends through the upper board 28. A seat board 31 is connected to the upper surface of the board 28 by means of skirt 30 of the board 31 and the above-mentioned pump 6 is fitted in the seat board 31. The seat board 31 is provided with six plugs 32.

Figure 3:
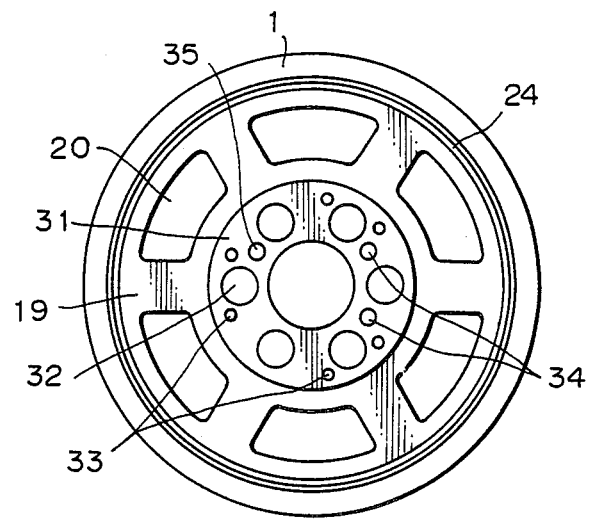
FIG. 3 is a plan view of an upper portion of a steam generator.

The plugs 32 can be pulled out of the seat board 31 when the hydraulically operated valves 7 and coolers 9 positioned right below the plugs are to be inspected and/or repaired. Pipes 33 are connected to the seat board 31 for supplying water to actuate the hydraulically operated valves 7. Although not shown, strainers are provided at the inlets of the pipes 33 to prevent dust and foreign matter from entering into the pipes 33. Also extending through the seat board 31 are cooler pipes 34 communicating with the inlets and outlets of the pipes 33 and thermocouple conduits 35 connecting with the inlets and outlets of the pipes 33, respectively (FIG. 3). Although not shown, the pipes 34 and 35 also extend through the cap 5 of the reactor vessel 1 to the exterior of the vessel. In addition, a poison supply pipe, a sampling pipe and a thermocouple conduit also extend through the vessel cap 5 to the exterior of the vessel.

A thermal shielding board 36 is provided on the inner surface of the vessel cap 5 to prevent the reactor cooling water from directly striking against the cap inner surface. A down comer 37 (shown by dotted lines in FIG. 1) extends downwardly from the lower end of the associated cooler 9 to the bottom of the tank to accelerate mixing of cooling water with poison by natural circulation within the tank.

The poison tank 3 comprises an inner cylinder 38 and an outer cylinder 39 which are connected together about the reactor core 2 by means of ribs 40 or the like. Each rib 40 is provided with a number of holes 41 (FIG. 5) to flow the cooling water from outside towards inside and bypassing the reactor core. The ribs may be replaced by a number of small diameter cylinders. The lower end of the outer cylinder 39 is connected to an outer bottom board 42 of the tank, whereas the lower end of the inner cylinder is connected to an inner bottom board 43 of the tank. A skirt 44 having a cooling water passage therein extends downwardly from the lower end of the outer cylinder 39 and seats on a lower seat 45 formed in a lower portion of the reactor vessel. The Rotation of the outer cylinder 39 is prevented by a key means (not shown).

Three cooling water passage means 46 extend between and connect the inner and outer bottom boards of the tank. The upper surface of the inner bottom board 43 defines a plenum 48 in cooperation with the lower surface of a lower support board 47 on the reactor core. Three means 8 are mounted on the inner bottom board of the poison tank and extend into the interior of the tank. A baffleboard 49 is provided on the tank inner bottom board 43 to prevent the poison from directly striking against the lower support board on the reactor core. The poison mixes with the primary cooling water before the poison flows into the reactor core.

Figure 5:
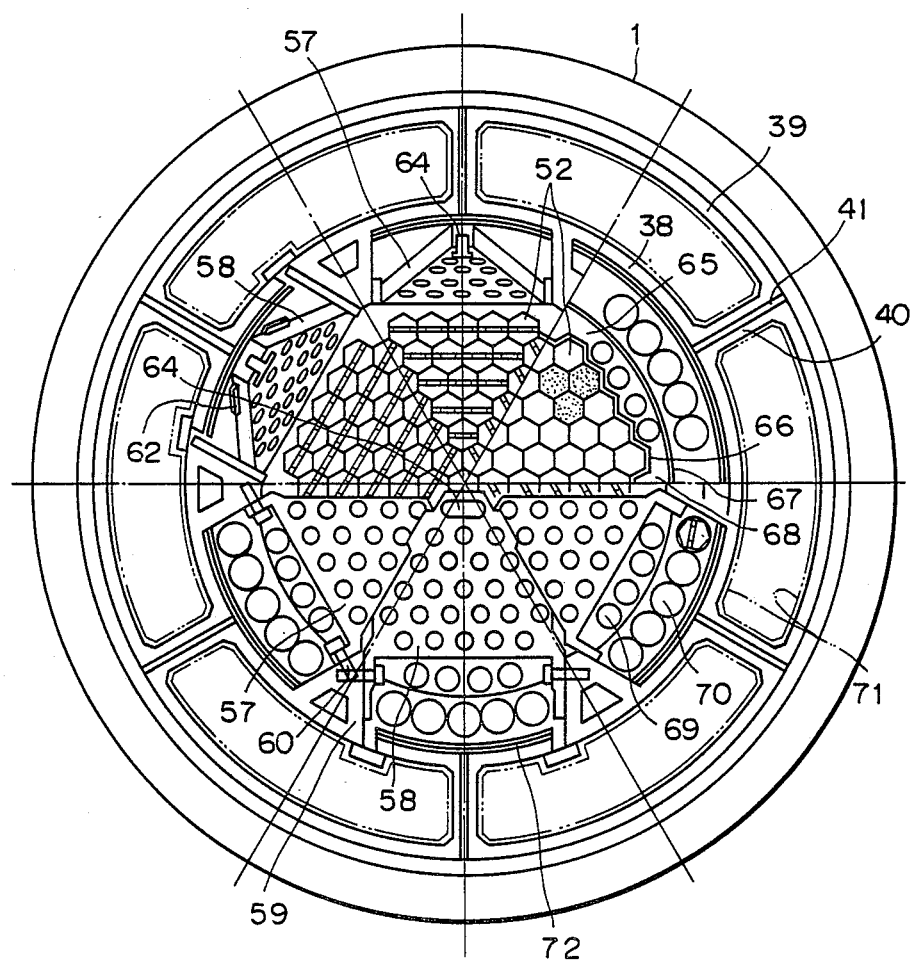
FIG. 5 is a plan view of upper portions of a reactor core and reactor.

The lower support board 47 of the reactor core supports an upper support board 51 of the reactor core with support stays 50 (or boards or tubes) extending therebetween. The arrangement is similar to that in PWR and BWR. Arranged on the upper support board 51 are fuel rod assemblies 52 of two types, such as a fuel rod assembly wherein no control rod element is included and a fuel rod assembly wherein control rod elements are included. The control rod elements 53 are inserted from below into guide tubes provided between the fuel rod elements in the fuel rod assembly 52. Alternatively, it may be also designed that guide tubes exclusively used for the control rod elements are provided independently of the fuel rod assembly. Furthermore, it is also within the scope of the present invention that all the control rod elements are included in the fuel rod assembly. The external configuration of the fuel rod assembly may be square as in PWR and BWR instead of the hexagonal external configuration in the illustrated embodiment (FIG. 5).

The control rod elements move upwardly and downwardly within guide tubes 54 which extend from the reactor core upper support board 51 into the tank outer bottom board 42. A drive shaft 55 is adapted to be connected to the control rod elements through a coupling 56. The control rod drive mechanism may utilize the technology of BWR. Disposed in an upper portion of the reactor core is a pivotal upper core board assembly provided with a thermocouple for determining the temperature of the cooling water at the outlet of the fuel assembly. The upper core board assembly consists of three smaller boards 57 and three larger boards 58. The smaller and larger boards 57, 58 are pivoted to seats 59 on the inner tank cylinder by means of hinge pins 60 on rockable members 57A, 58A respectively.

In consideration of the limited space, the level of the hinge pins 60 for the smaller boards 57 is higher than that of the hinge pins for the larger boards 58. In order to prevent the boards 57, 58 from contacting the fuel rod assembly when the boards pivot downwardly about the pivot or hinge pins 60, stoppers 61 (FIG. 7) are provided on the seats 59. Each larger board 58 is provided at the opposite ends thereof with projections 62 (FIG. 5) for depressing the associated smaller board 57 down, and in order that the fuel rod assembly will not move up and the boards 57, 58 will not pivot upwardly inadvertently, lock pins 63 are adapted to be inserted into slots 63A in the rockable members 57A, 58A by operating a manipulator.

In order to pivot the boards 57, 58 upwardly and downwardly, a hook suspended from a winch is hoisted and lowered by the manipulator. For such purpose, each of the smaller and larger boards 57, 58 is formed at the leading end thereof with a hole 64 for receiving the hook. Positioning means is provided on the outer periphery of the reactor core for positioning the fuel rod assembly. The positioning means comprises a baffle structure 65, for example and the baffle structure consists of an inner wall 66, an outer cylinder 67 and a reinforcing board 68. Check valves 69 are provided in the region of the positioning means to accelerate natural circulation when the reactor ceases operation. Although not shown, a neutron detector is brought to this region through a conduit which extends through the poison tank, and in addition storage cylinders 70 are disposed in this region for collecting used fuel rod assemblies. As shown, when the smaller and larger boards 57 and 58 are pivoted downwardly, a fuel replacement operation can be performed in this region, and on the other hand, when the boards are pivoted upwardly, fuel replacement can be performed in the reactor core. The fuel replacement is performed as follows, for example: one used fuel rod is taken out of the reactor with the smaller and larger boards held in their downwardly pivoted position and one new fuel rod is placed into one storage cylinder 70. The procedure is repeated to replace all the used fuel rods with new fuel rods. Next, two larger board and one smaller boards are pivoted upwardly and one fuel rod in the last batch is placed into one storage cylinder 70. This procedure is repeated. In this way, the used fuel rods in one batch are disposed of to thereby simplify the fuel rod replacement system.

Lastly, all the used fuel rods are filled in the storage cylinders 70. Under such circumstance, the used fuel rods are not stored for a long time period. In such a case, the fuel replacement device (disposed on the exterior of the reactor vessel) is required to be provided with cooling means. First of all, new fuel rods are replaced into a required number of empty storage cylinders 70 with the pivotal boards held in the downwardly pivoted position. In this case, at least one storage cylinder is left empty. Next, the used fuel rods are placed into the storage cylinders except for the one storage cylinder following the above-mentioned replacement procedure. Thereafter, all the used fuel rods are taken out of the reactor core with the pivotal boards held in the downwardly pivoted position. When the replacement procedure is employed, the storage cylinders serve to simplify the fuel replacement operation.

The inner surface of the poison tank, the outer surfaces of the ribs within the tank and the outer surfaces of the pipes are lined with adiabatic material 71 to minimize the heat exchange of the fuel with the primary cooling water. Also, the inner surface of the tank inner cylinder (the surface facing the reactor core) is provided with flow passage forming cylinders 72 to maintain the tank inner cylinder at a temperature substantially the same as that of the tank outer cylinder by the flow bypassing the reactor core. This bypassing flow is supplied through a number of small holes 73 formed in the periphery of the core support board and combines with the water flow coming from the holes 41 in the ribs and further with the water at the outlet of the reactor core in an upper region. In a further upper region, a small amount of flow bypassing the steam generator is produced between the inner cylinder 27 of the steam generator and the outer cylinder 30 of the poison tank to thereby maintain the tank outer cylinder at a temperature substantially the same as that of the tank inner cylinder.

In the foregoing, it has been described that the down comer is disposed within the heat transfer section, but there is a case wherein the down comer is preferably disposed out of the heat transfer section from the view point of external aesthetics. It is also contemplated that a number of modular steam generators (eight modular steam generators, for example) are employed. Also in this case, the water supply headers and steam supply heaters are provided in the cap 5.

Figure 6:
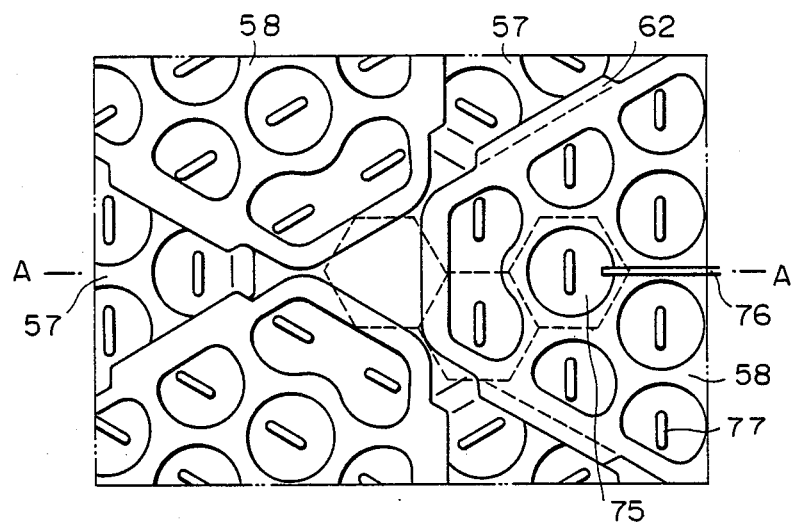
FIG. 6A is a detailed view of the leading end of an upper board of the reactor core.
FIG. 6B is a cross-sectional view taken along the line A—A of FIG. 6A.
Figure 6B:
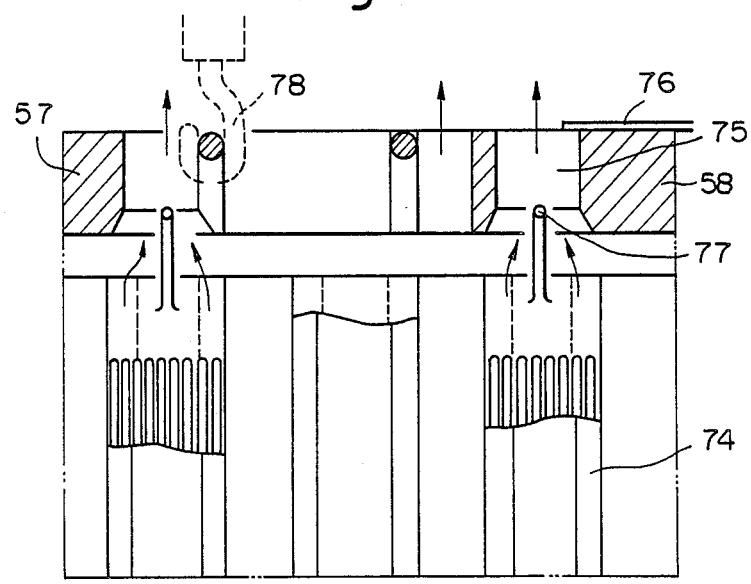

FIGS. 6(A) and 6(B) show the details of the leading ends of the upper reactor core boards. The three smaller boards 57 are held down by the edges of the holding-down projections 62 on the three larger boards 58. The dotted hexagons in FIG. 6(A) show the positions of fuel rod assemblies 74. The upper core support boards 58 are formed with cooling water flow passages 75 positioned above the fuel rod assemblies 74 and the cooling water flows in the directions of the arrows in FIGS. 6(B). A temperature determining thermocouple 76 is provided on the board 58 in the region of the fuel rod assembly 74. A member 77 adapted to be hung from a hook 78 is provided on the top of the fuel rod assembly 74 in a manner similar to that in BWR, for example. The leading ends of the smaller and larger boards 57 and 58 are adapted to be caught and hoisted by the hook 78.

Figure 7:
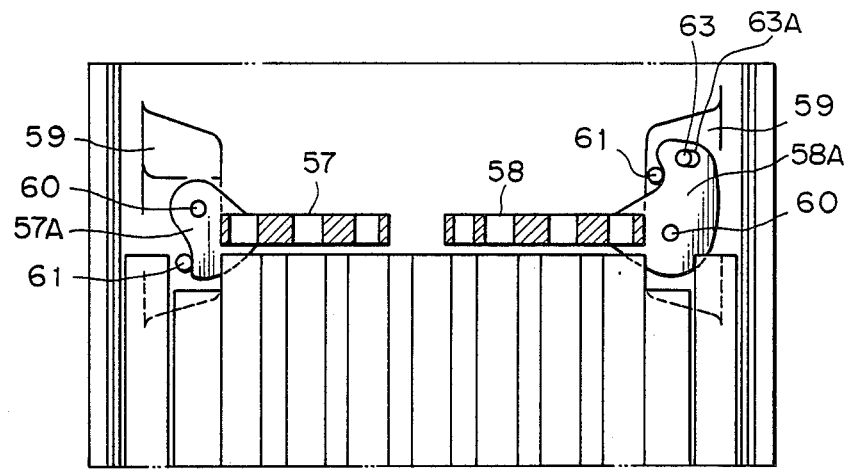
FIG. 7 is a view showing the mounting of the upper board of the reactor core.

FIG. 7 shows the mounting of the upper core support board.

Figure 8A:
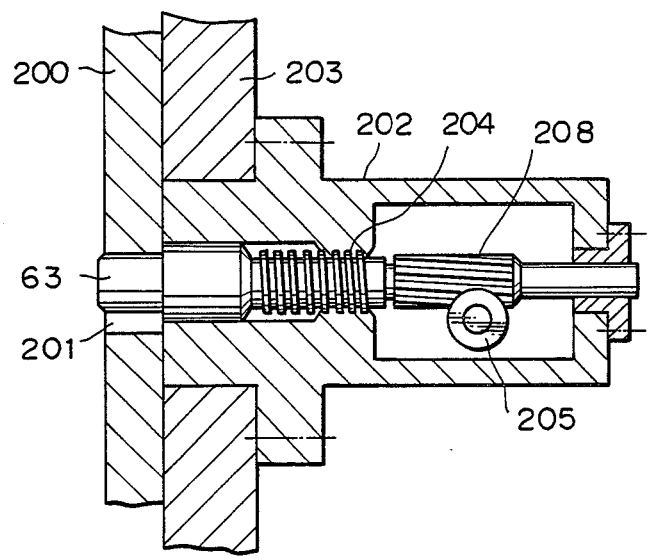
FIGS. 8A and 8b are cross-sectional views of a lock pin inserting and removing device.
Figure 8B:
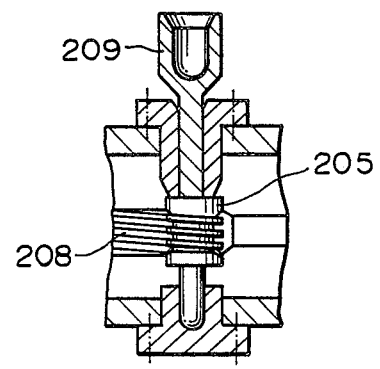

FIGS. 8(A) and 8(B) are sectional views showing the device for manipulating the lock pin 63 for the hinge. In these Figures, the pin 63 is shown as being inserted in a hole 201 in a hinge 200 for an associated larger board 58. Drive means 202 is mounted on a seat 203 formed on the poison tank. The lock pin 63 is inserted into and removed out of the hole 201 by a feed screw 204 rotated by a worm gear 205 and a worm wheel 208. The shaft of the worm gear 205 is formed with a seat 209 on which a rotor carried by the manipulator is adapted to seat.

Figure 9:
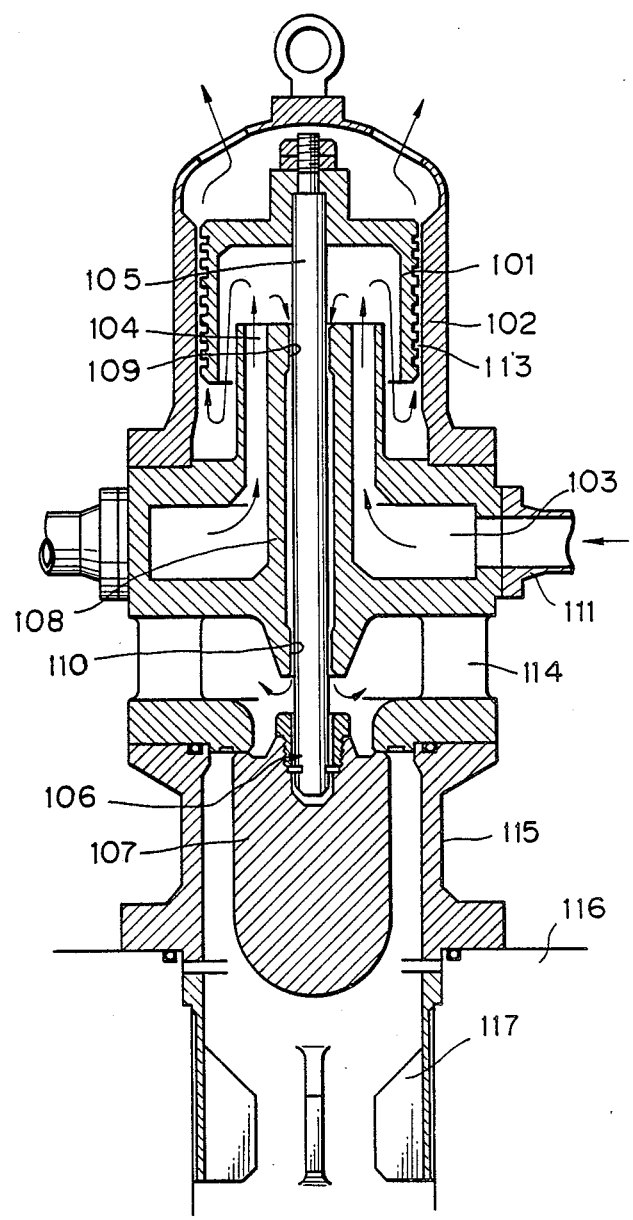
FIG. 9 is a vertically sectional view of a hydraulically operated valve showing the valve in its operative position.
Figure 10:
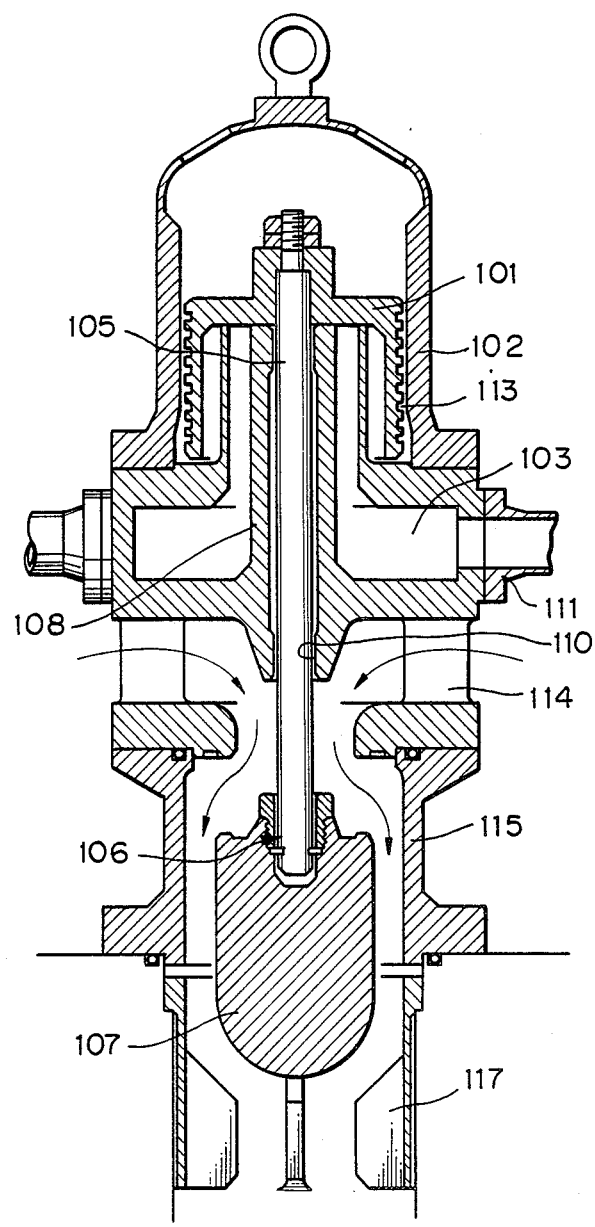
FIG. 10 is a vertically sectional view of the hydraulically operated valve showing the valve in its inoperative position.

FIG. 9 is a vertically sectional view of the hydraulically operated valve (corresponding to valve 7 of FIG. 1) showing the valve in the operative position, and FIG. 10 is a vertically sectional view of the hydraulically operated valve showing the valve in the inoperative position.

The drive mechanism of the valve comprises a piston 101, a cylinder 102, a high pressure water chamber 103 and an annular spouting port 104. The lower end of the shaft 105 of the piston is connected through a flexible joint 106 to a valve member 107. An inner cylinder 108 defining the spouting port 104 is formed with upper and lower bearings 109, 110 for centering the valve member 107. Water under a pressure higher than the environment pressure by two atmospheres, for example, is introduced through the inner cylinder and port 104 from a high pressure tube 111. When the pump is actuated, the water flows in the direction of the arrows to raise the piston as shown in FIG. 9 so as to cause the valve member 107 to seat on a valve seat. The upper and lower bearings 109 and 110 are spaced from the shaft 105 by an amount just sufficient to prevent the shaft and cylinder from securing together, and the piston 101 and cylinder 102 are spaced from each other by a greater amount. In order to control leakage flow, the periphery of the piston is formed with peripheral grooves 113. The weight of the valve member 107 is sufficient to positively unseat the valve member from the seat when the pump ceases operation. Reference numeral 114 denotes support legs, and the valve is supported on upper support board 116 of the poison tank with support cylinders 115 interposed therebetween. A drop prevention member 117 is fitted in an opening in the board 116.

Figure 11:
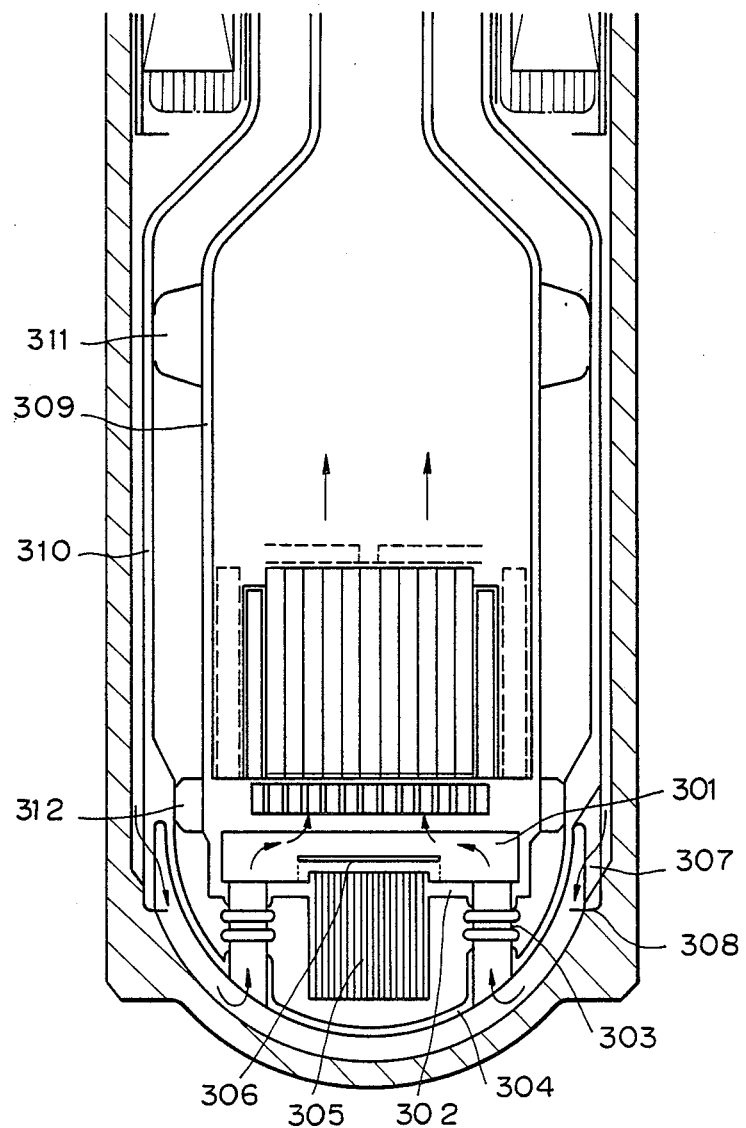
FIG. 11 is a vertically sectional view of a second embodiment of the nuclear reactor wherein no control rod is employed in the reactor.

FIG. 11 is a vertically sectional view showing another embodiment of the nuclear reactor wherein no control rod is employed. Since the upper half portion of the reactor is identical with the corresponding portion of the first embodiment, only the lower half portion of the second embodiment will be described.

In the second embodiment, since the reactor core is allowed to move upwardly and downwardly due to thermal expansion, the inner and outer cylinders of the poison tank are not required to be firmly connected together and it is also unnecessary to maintain the inner and outer cylinders at substantially the same temperature. Although the reactor core may be designed as described in connection with FIG. 2, in this second embodiment the core is designed to move upwardly and downwardly due to thermal expansion. The bottom of a plenum 301 at the inlet of the reactor core serves as the inner bottom board 302 of the poison tank and cooling flow pipes 303 with bellows are provided at six circumferentially spaced points about the board 302 and are connected to a tank spherical outer bottom board 304. A poison thermal expansion absorber 305 is provided at the central area of the inner bottom board 302 and a baffle board 306 is provided on the top of the absorber 305. A skirt 307 extends downwardly from the lower end of the outer cylinder 310 and is formed with a cooling medium flowpath. The skirt 307 seats on a shoulder 308 formed in a lower portion of the reactor vessel. The tank is prevented from rotating by key means. In order to maintain an annular space between the inner and outer cylinders 309 and 310 of the tank, vertically slidable spacers 311 and 312 are attached to the outer surface of the inner cylinder 309. The other components of the second embodiment are identical with the corresponding components of the first embodiment.

Figure 12:
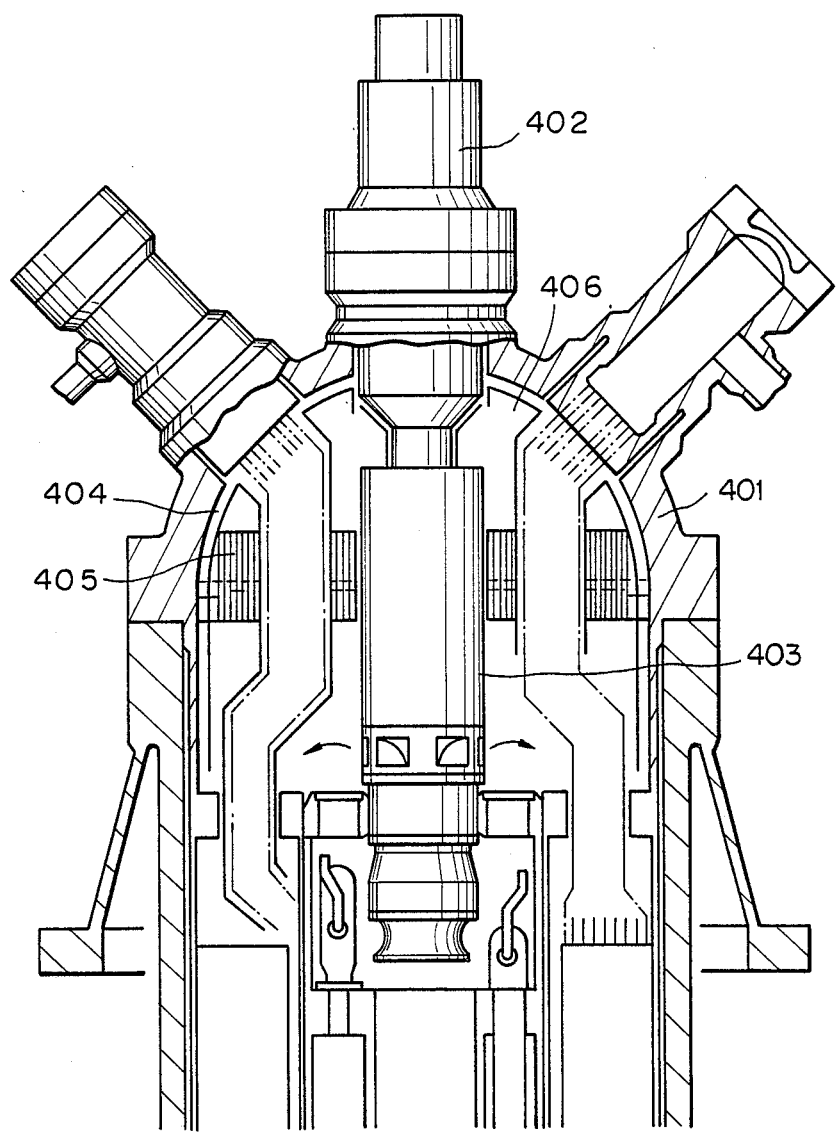
FIG. 12 is a vertically sectional view of a third embodiment of the nuclear reactor wherein a pressurizer is disposed in the vessel.

FIG. 12 is a vertically sectional view of the upper half portion of a third embodiment of the nuclear reactor wherein a heater is incorporated according to the present invention. The other portion or lower half portion of the reactor of this embodiment is identical with the corresponding portion of the foregoing embodiments. A pump 402 is provided on the top of the reactor vessel cap 401 and has a casing 403 in which an electric heater (evaporator) is disposed. A heat shielding board 404 is applied to the inner surface of the vessel cap 401 to prevent produced steam from directly contacting the cap of the vessel and the heat transfer tube. Also, in order that the steam will not condense upon contacting the surface of water at a low temperature, a heat transfer resisting device 405 which may be a honeycomb structure or a bundle of thin walled tubes is provided. The surface of water is controlled within the length of the heat transfer resisting device. Reference numeral 406 denotes a steam chamber defined within the reactor vessel. Although not shown, a pressure release valve is connected to the cap 401 of the vessel to release steam when the pressure exceeds a predetermined level. Although not shown, a small size pump is attached to the vessel cap 401 and a spray means which serves as a pressure reducing device is connected to the pump. The spray means absorbs water at the discharge side of the main pump and sprays the water against the steam chamber from above to reduce the pressure. Alternatively, water at the outlet of the steam generator is pressurized by the pump and then sprayed.

Figure 13:
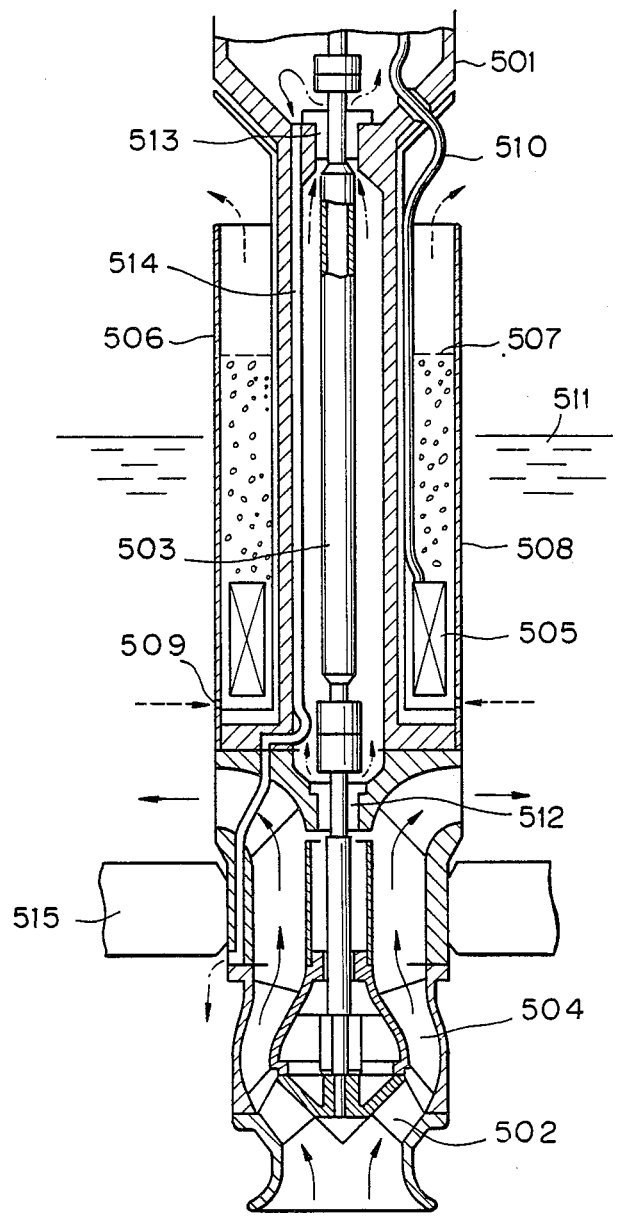
FIG. 13 is a vertically sectional view of a pump wherein a pressurizer is disposed.

FIG. 13 is a vertically sectional view showing the construction of a pump in which a pressurizer is incorporated. A casing 501 of the pump houses a shaft 503 adapted to drive an impeller 502 and water from the outlet of the reactor core enters the pump in the direction of the arrows, is accelerated by the impeller 502, passes through guide blades 504 and emerges at discharge ports. An electric heater 505 is connected to the periphery of the casing 501 through an adiabatic board (not shown) and the inner surface of an outer cylinder 508 is also provided with an adiabatic board. Steam generated by heating the water by the electric heater 505 enters the steam chamber as shown by the dotted lines. Water is replenished into the casing 501 through a small hole 509 formed in a lower portion of the outer cylinder 508. A heater lead 510 extends through the interior of the pump casing. Reference numeral 511 denotes the reference surface of water and reference numeral 507 denotes the surface of water within the pressurizer when steam is generated. In order to uniformly cool the pump casing and shaft, a flowpath is formed as shown by the one-dot-chain lined arrows. That is, water passing through or an area adjacent to a bearing 512 flows upwardly to a bearing 513 or an area adjacent to the bearing and discharges therefrom. The water is guided to the pump suction side by means of a pipe 514. Reference numeral 515 denotes the seat board of the poison tank.

Figure 14:
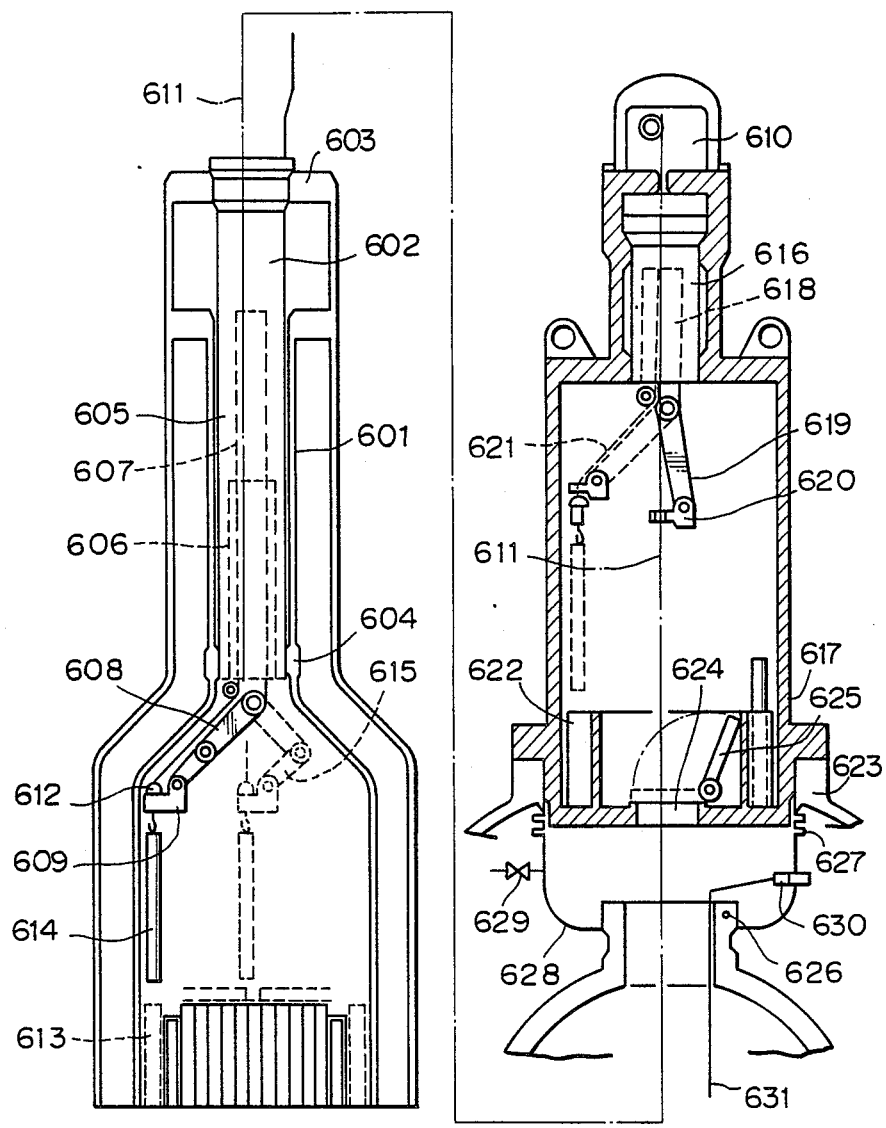
FIG. 14 is a view showing a fuel exchange system.

FIG. 14 shows one embodiment of a fuel replacement device. A fuel replacement manipulator 602 is mounted in an upper reduced diameter portion 601 of the tank inner cylinder. The manipulator 602 is carried by a crane to be fitted with an upper portion thereof in an upper tank board 603, whereby weight support, rotation prevention and support in the radial direction are effected, and fitted with a lower portion thereof in a bearing 604, whereby the manipulator is supported in the radial direction. Disposed within the manipulator 602 are a rotary cylinder 606 and a vertically movable shaft 607 as shown by dotted lines. The shaft 607 is an articulated manner connected at the lower end thereof to an arm 608 and to a gripper 609. In this case, by pulling a wire or cable 611 upwardly to a degree to remove the slack therein, the manipulator bears a load. Thereafter, a fuel rod assembly 614 is horizontally moved to a center position as shown by the dotted lines 615 and, the gripper is opened to release a hanger to be hoisted by winding up a winch. An external fuel replacement manipulator 616 is mounted on the top of a vessel 617 and serves to guide the wire 611 suspended from the winch 610. The manipulator 616 has a rotary cylinder 618 disposed therein as shown by the dotted lines and at the lower end an arm 619 which has a wire guide 620 at the lower end. Dotted lines 621 denote the position of a fuel rod hoisted above a fuel rod storage tube 622 to be received therein. Thereafter, the winch 610 is rewound to place the fuel rod into the fuel storage tube 622 and the hook is then disengaged from the fuel rod. In order to bring the fuel rod into the nuclear reactor, the above-mentioned procedure is reversed. The vessel 617 is carried onto an upper flange 623 of a primary container to be mounted thereon. If necessary, the vessel is bolted to the flange 623. The bottom wall of the vessel 617 is formed at the central area with a through hole 624 through which the fuel rod passes. A lid 625 is provided on the bottom wall adjacent to the hole so as to close the hole after the completion of the fuel rod replacement. Interposed between the flange 623 and a pump seat 626 on the top of the reactor vessel is a receptacle 628 with a bellows 627 which absorbs thermal expansion to prevent water from splashing at the time of fuel rod replacement. A valve 629 is provided on the receptacle 628 and remains open except when the fuel rod replacement is performed so that no differential pressure occurs between the vessel and the surrounding atmosphere. When a fuel rod is handled after the fuel rod has been stored for a long period of time, the surface of the water may be at a level lower than the pump seat, but when a fuel rod has a high decay heat at a time such as immediately after stopping the operation of the reactor, the vessel 617 is filled with water. If necessary, a cooler is incorporated in the vessel. The receptacle 628 is provided with connectors 630 to which may be connected a line 631 such as an electric wire and the like for driving the manipulator within the reactor and/or illumination.

Figure 15A:
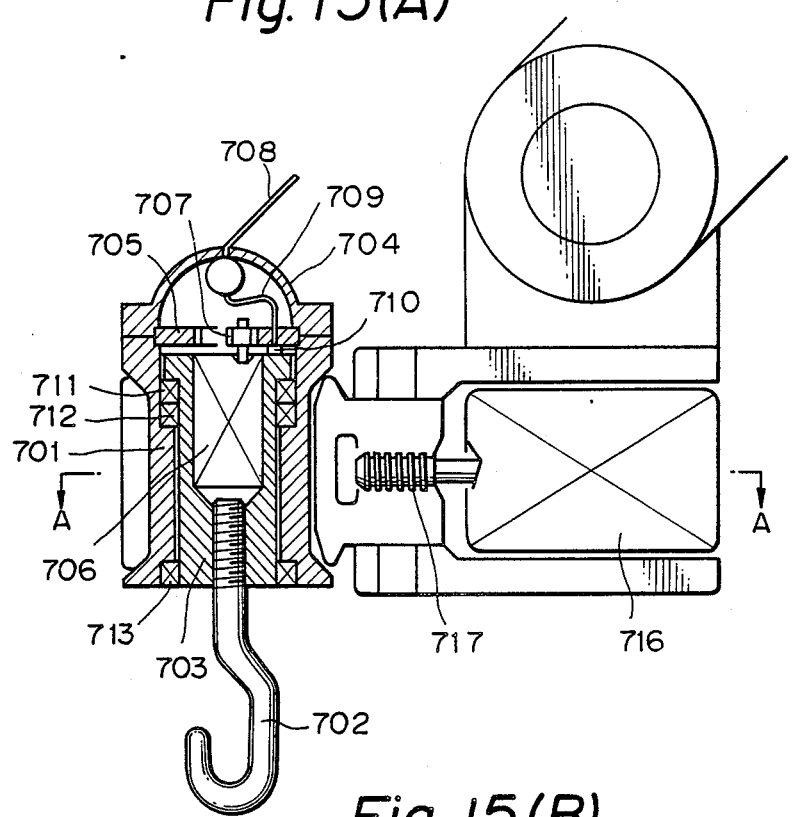
FIG. 15A is a view of a hanger and gripper.
Figure 15B:
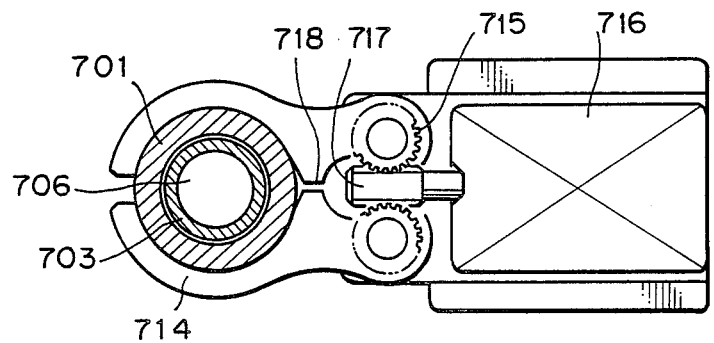
FIG. 15B is a cross-sectional view taken along the line A—A of FIG. 15A.

FIGS. 15(A) and 15(B) show the hanger and gripper. The hanger comprises a cylindrical body 701, a hollow rotor 703 having a hook 702 at the lower end, a cap 704, an internally toothed gear 705, a motor 706 disposed within the rotor and having reducing gears and a gear 707 to be driven by the motor. A wire 708 for hanging the hanger has an electric motor wire 709 incorporated therein as the core thereof and current is supplied to the motor by a slidable contact 710. In order to smoothly rotate the rotor, there is provided a thrust bearing 711 and radial bearings 712, 713.

The gripper has a pair of clasps 714 and worm wheels 715 at the bases of the clasps. The gripper is opened or closed as a worm gear 717 is rotated in one or the opposite direction by a motor 716 with reducing gears. The gripper is shown in the gripping or closed position. When a heavy article such as the upper core support board is hoisted, the hook in the hanger catches the article and the clasps are opened. The hook is then hoisted and the clasps are closed with the article abutting against the joint 718 of the clasps. The wire is passed about the hook and the winch is wound up and the gripper is pushed radially outwardly. If necessary, the procedure described in connection with the fuel rod replacement operation may be employed.

Figure 16:
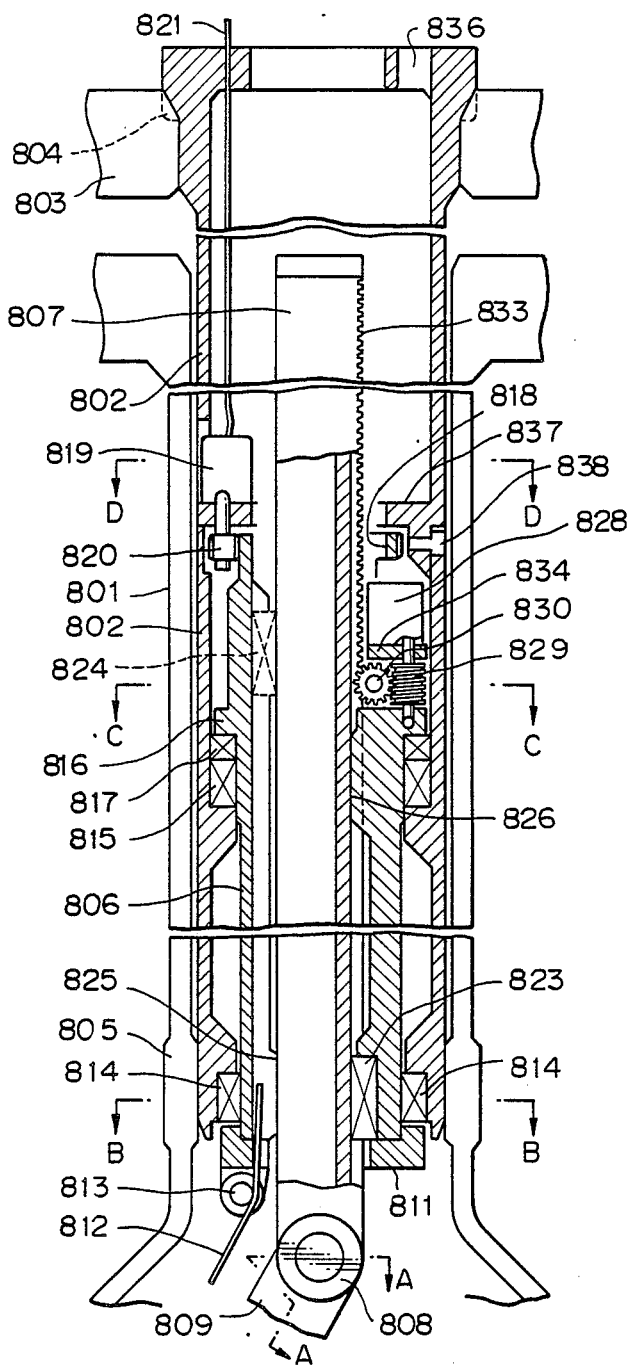
FIG. 16 is a vertically sectional view of the inner manipulator for fuel rod exchange.

FIG. 16 is a vertically sectional view showing the construction of the fuel rod replacement manipulator within the reactor. A body 802 of the manipulator is fitted in an upper poison tank board 803 and mounted in an inner poison tank cylinder 801. The manipulator body is provided with a rib 804 to hold the manipulator body against rotation and the rib is adapted to engage in a groove formed in the board 803. The lower end portion of the manipulator body engages a bearing 805 formed on the inner cylinder 801 formed by bulging a portion of the inner cylinder radially inwardly and is supported by such bearing radially. A rotary sleeve 806 is disposed within the inner cylinder 802 and a shaft 807 extends within the sleeve 806 for vertical movement.

Figure 17:
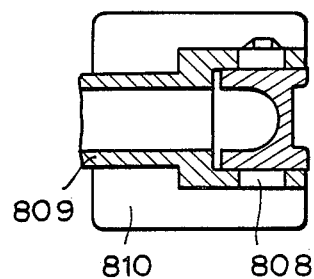
FIG. 17 is a cross-sectional view taken along the line A—A of FIG. 16.

The lower end of the shaft 807 is connected to an arm 809 by means of a joint 808. The arm 809 is rotated by a motor 810 with reducing gears (FIG. 17). The lower end of the rotary sleeve 806 is provided with a lid 811 which is provided with a guide roller 813 about which a wire 812 adapted to suspend the hanger is guided. Although not shown, a television camera or illumination device may be attached to the lid 811.

Interposed between the manipulator body 802 and rotary sleeve 806 are spaced radial bearings 814 and 815 which afford smooth rotation of the rotary sleeve 806 and a thrust bearing 817 is provided right below a flange 816 on the rotary sleeve 806 wherein the weight of the rotary sleeve is supported in the radial direction. The upper end of the rotary sleeve 806 is provided with a gear 818 which is rotated by a gear 820 to be driven by a motor 819 with reduction gears. Reference numeral 821 denotes a motor electric wire. The electric wires of the other motor and illumination device are also connected through this region to connectors outside of the reactor.

The inner side of the rotary sleeve is adapted to contact on slide faces 822 thereof with the shaft 807 in the lateral direction in which no force is applied, at an area where a force by the weight of a fuel rod is applied by slide bearing 823, 824, and at an area where no force is applied by slide faces 825, 826 with the shaft.

Figure 18:
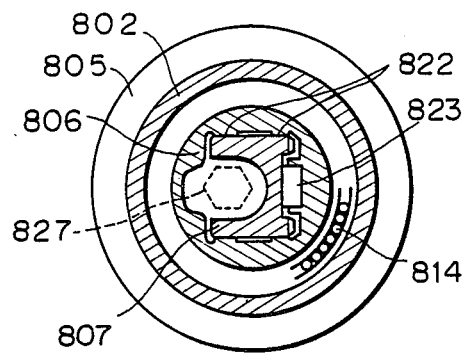
FIG. 18 is a cross-sectional view taken along the line B—B of FIG. 16.
Figure 19:
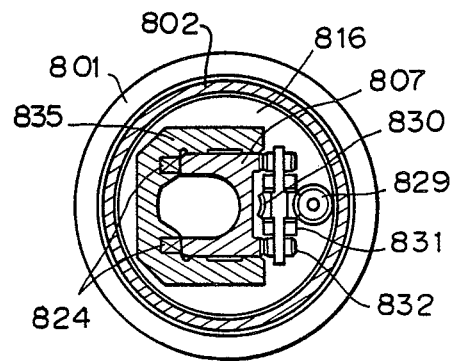
FIG. 19 is a cross-sectional view taken along the line C—C of FIG. 16.
Figure 20:
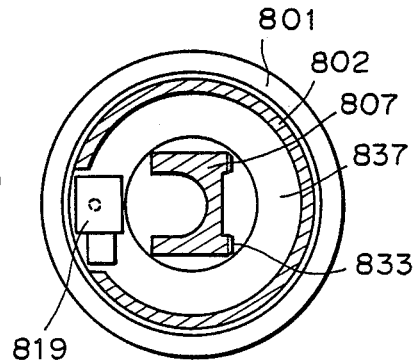
FIG. 20 is a cross-sectional view taken along the line D—D of FIG. 16.

The shaft 807 has a U-shape and is formed with a hole through which the fuel rod assembly 827 (shown by dotted lines in FIG. 18) passes. A mechanism for moving the shaft upwardly and downwardly is mounted on flange 816 of the rotary sleeve. A worm wheel 830 is rotated by a worm gear 829 adapted to be driven by a motor 828 with reduction gears and the shaft 00807 to which a rack 833 is attached is moved upwardly and downwardly by gears 832 at the opposite ends of a bearing 831.

A board 834 which supports the shaft of the worm gear 829 and on which motor 828 is mounted is held in position by being bolted to a U-shaped support structure on the flange 816. As an option, the worm wheel 830 and worm gear 829 may be designed as bevel gears.

The board at the upper end of the manipulator body 802 is formed at the central area thereof with a hole 836 through which a hook to be hoisted by a crane passed. The manipulator body consists of upper and lower sections connected together at a bottom board 837.

According to the present invention, as in the case of the prior art nuclear reactors, the reactor vessel houses the primary cooling system appliance and is designed to incorporate the poison tank as an emergency stop system in the vessel and provides the following effects: (1) The poison tank surrounds the reactor core. A space is provided above the core for operating the manipulator, but the upper portion of the core is reduced in diameter to provide a space necessary for fuel rod replacement and the steam generator is disposed about the reduced diameter upper portion. In this way, the space within the reactor vessel can be effectively utilized and the steam generator and a control rod drive mechanism can be protected against radioactivity.

(2) The upper surface can be constituted by only a honeycomb structure as in the case of the prior art ultrasafe reactors and exhibits a novel reactor. However, in order to further enhance performance, the valve is employed to eliminate the above-mentioned drawbacks. It has been already proposed that a check valve is employed as a valve, but the prior art reactors employing the check valve present the problems that the valve fastening pressure can not be increased at the operation of the reactor and that the operation of the valve is uncertain when gases are produced within the poison tank. According to the present invention, the hydraulic valve lifts the piston 101 by the utilization of the discharge pressure of the main pump as a driving force. By the use of the hydraulic valve, the above-mentioned drawbacks can be overcome. (3) With respect to the problem relating to the mounting of the primary cooling system appliance, it already has been described that the steam generator is disposed about the poison tank, but by the following arrangement, the assembling and maintenance of the nuclear reactor is made easy, that is, by the provision of the water supply headers and steam headers of the steam generator in the cap of the nuclear vessel, the steam generator and vessel cap are made unitary to thereby reduce the number of assembling steps at the job site. Also, when a substantial repair is performed, the steam generator and cap assembly can be easily pulled out of the reactor. Further, only one pump is required for feeding cooling water, and therefore the pump can be disposed on the top of the reactor vessel cap. When a fuel rod replacement operation is performed, the pump is removed from the cap and inspected. The pump seat is utilized as the insertion port of the fuel rod replacement device. In this way, space can be effectively utilized and the system can be simplified. (4) Although the pressurizer for the primary cooling system may be disposed externally of the reactor as in the prior art PWRs, in order to eliminate problems relating to breakage of the piping and symplifying the layout, the pressurizer is preferably disposed within the reactor vessel. In order to save the space for installation and symplifying maintenance, according to the present invention, a portion of the pump casing (the region surrounding the shaft supporting sleeve) houses an evaporator in the form of an electric heater. (5) Since the upper portion of the poison tank is reduced in diameter, the problem that the conventional system cannot be employed in the upper mechanism of the reactor core can be solved by the pivotal upper core board mechanism.

And the fuel rod replacement operation can be effectively performed by the system in which the manipulator is mounted on the upper reduced diameter portion of the tank inner cylinder and the rotary hanger is caught by the hook suspended from the overhead winch to hoist used fuel rods. (6) The principle of the present invention is applicable both to a reactor which employs the control rods and the a reactor which does not employ control rods. (7) In the foregoing, description has been made of a light water reactor, but the invention is equally applicable to a reactor employing heavy water or a mixture of light and heavy waters. Different from the conventional PWR and BWR, the reactor of the present invention does not employ water in great amounts and thus, heavy water can be employed. Thus, the present invention can realize high fuel conversion ratio nuclear reactors.

While only specific embodiments of the invention have been shown and described in detail, it will be understood that the same are for the purpose of illustration only and not to be taken as a definition of the invention, reference being had for this purpose to the appended claims.

What is claimed is:

1. A nuclear reactor comprising:
   a reactor vessel;
   a reactor core disposed within said vessel and including fuel rods;
   a primary cooling system within said reactor vessel and including a steam generator and a pump for passing primary cooling water through said reactor core;
   a poison tank disposed within said reactor vessel and containing a boric acid solution of a concentration sufficient to shut down said reactor core, said poison tank including a lower portion surrounding said reactor core and a reduced size upper portion extending above said reactor core;
   said steam generator surrounding said reduced size upper portion of said poison tank;
   the top of said upper portion of said poison tank having means for blocking communication of said poison tank with primary cooling water in said reactor core during normal operation of said pump, and for, upon decreased operation of said pump, opening communication between said poison tank and said primary cooling water to thereby enable boric acid solution to be supplied to said reactor core and thus shut down said reactor core, said means comprising at least one valve having a valve member and operatively connected to said pump to urge said valve member to a closed position, blocking communication between said poison tank and said primary cooling water, by pressure generated by said pump during normal operation thereof, whereby upon removal of such pressure said valve member moves to an open position opening communication between said poison tank and said primary cooling water; and
   means, between the lower end of said poison tank and said primary cooling water, for, upon said valve being opened, allowing boric acid solution to communicate with said primary cooling water and said reactor core.

2. A nuclear reactor as claimed in claim 1, wherein said reactor vessel includes a cap having water supply headers and steam headers connected to said steam generator, and said pump is disposed on the top of said cap.

3. A nuclear reactor as claimed in claim 1, wherein said pump includes a casing and an electric heater disposed within said casing.

4. A nuclear reactor as claimed in claim 1, further comprising smaller and larger core boards having thermocouples and pivotally mounted above and covering said fuel rods.

5. A nuclear reactor as claimed in claim 4, wherein said poison tank has an annular configuration including an inner wall defined by an inner cylinder, and further comprising means mountable within said inner cylinder of said poison tank above said reactor core for, upon removal of said pump, for replacing spent fuel rods.

* * * * *